June 15, 1943.  C. P. CLARE ET AL  2,322,114
PROTECTIVE CIRCUIT
Filed Sept. 17, 1941  2 Sheets-Sheet 1

INVENTORS
CARL P. CLARE and CHARLES W. CHILLSON
BY
ATTORNEY.

June 15, 1943.  C. P. CLARE ET AL  2,322,114
PROTECTIVE CIRCUIT
Filed Sept. 17, 1941  2 Sheets-Sheet 2

INVENTORS
CARL P. CLARE & CHARLES W. CHILLSON
BY
ATTORNEY

Patented June 15, 1943

2,322,114

UNITED STATES PATENT OFFICE 2,322,114

PROTECTIVE CIRCUIT

Carl P. Clare, Arlington Heights, Ill., and Charles W. Chillson, Lake Packanack, N. J., assignors to Curtiss-Wright Corporation, a corporation of Delaware Application September 17, 1941, Serial No. 411,102

19 Claims. (Cl. 172—293)

This invention relates to governed constant speed motors and to circuit control apparatus therefor.

Although the invention has general utility, it is particularly adapted for use in electrical controllable pitch propeller synchronizing apparatus as used in aircraft and it is such an environment in which we illustrate the provisions of the invention.

An object of the invention is to provide, in connection with a D. C. actuated governed constant speed motor and controlled apparatus associated therewith, a protective device by which the controlled apparatus is segregated from control by the governed motor at such times as the governed motor may not be running at its prescribed constant speed, due either to mechanical or electrical failure in the system, to excessive or inadequate voltage supply to the constant speed motor, or to other causes.

In application Serial No. 393,400, filed May 14, 1941, a controllable pitch propeller synchronizing apparatus is shown and described; the drawings in this application are identical with part of the drawings in the application identified. The present specification will cover generally the same apparatus as in said copending application, but will recite the protective system in detail.

A further object of the invention is to provide a protective relay system for electrical apparatus which when subjected to interrupted D. C. or to alternating current, will allow operation of a controlled means but which, when subjected to no current or to direct current, will disconnect the controlled means from operation.

A further object is to provide, in combination with a governed constant speed motor, means responsive to deviations of the motor from said constant speed to disconnect it from controlled circuits. The use of the invention is particularly desirable in synchronizing systems for one or more aircraft propellers which are synchronized to rotate at the same speed as a master speed governed motor. If the master motor deviates from a pre-set speed, all of the propellers will deviate in unison therewith which, of course, is objectionable. Furthermore, should the master motor fail, over speed, or stop, the propellers will do likewise, which might inject hazardous factors into operation of the aircraft. On the other hand, when the protective device of this invention is utilized, any form of failure of correct functioning of the master motor will disconnect same from the propellers and will allow said propellers to remain in fixed pitch whereat engine load will be absorbed although the propeller driving engines may drift slightly from synchronism. This, of course, would entail no hazard and the aircraft crew can effect manual propeller pitch control for approximate synchronization of several propellers.

Further objects of the invention will be apparent in reading the annexed description in connection with the drawings, in which.

Figure 1:
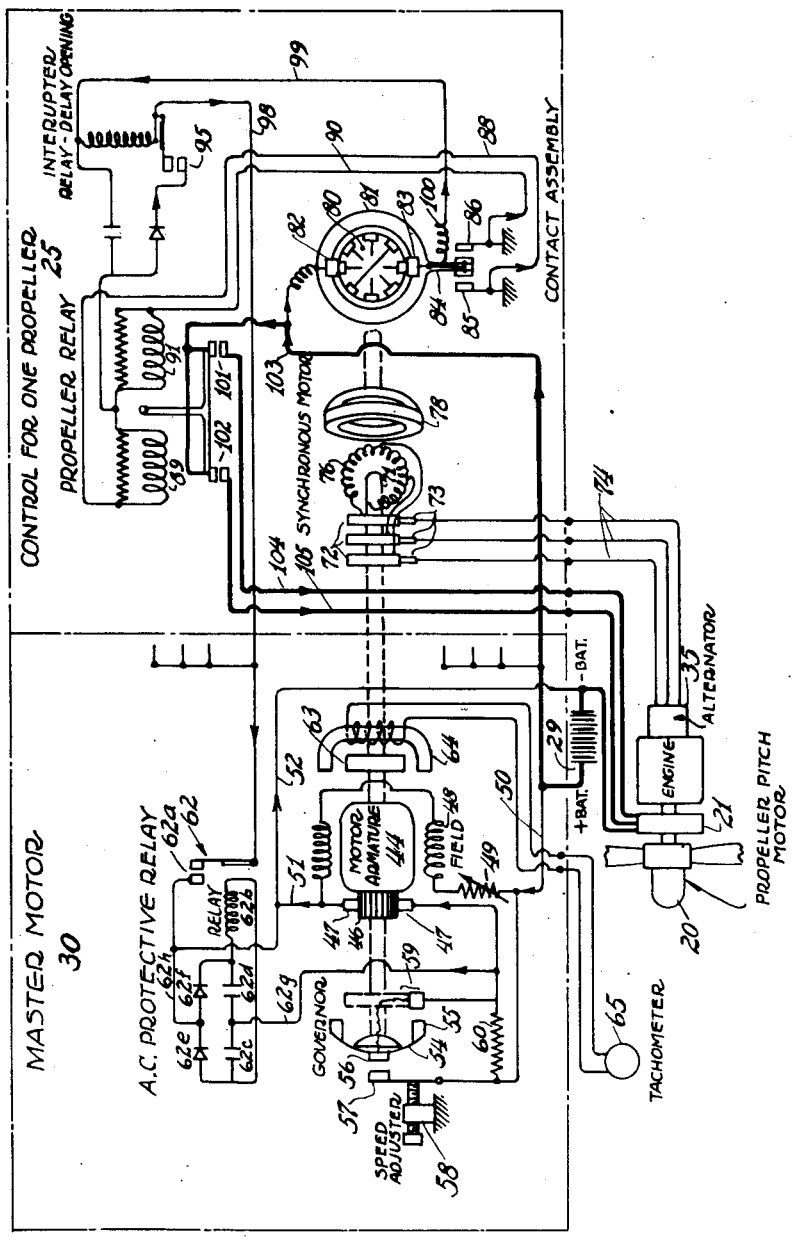
Fig. 1 is a functional wiring diagram of the provisions of the invention.
Figure 2:
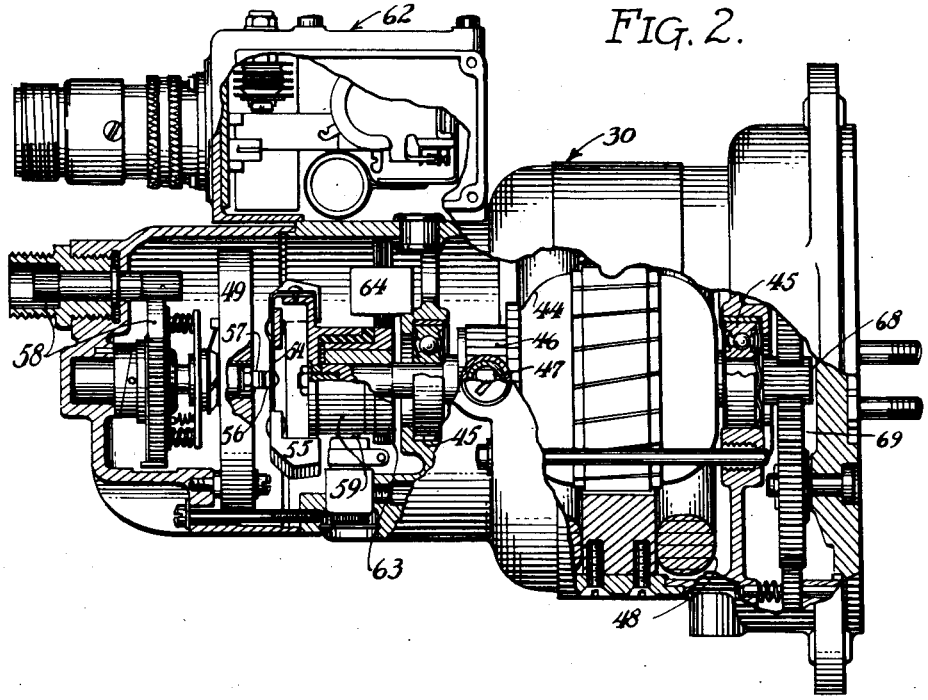
Fig. 2 is a longitudinal section through an actual embodiment of a master speed control motor.
Figure 3:
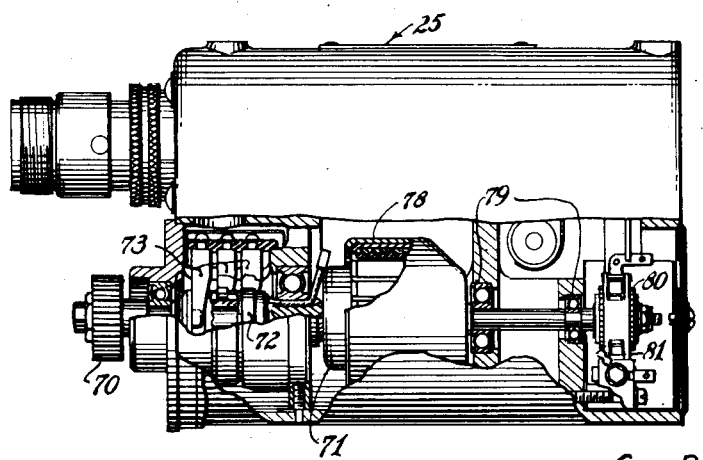
Fig. 3 is a partial longitudinal section through one of the propeller controls operated by the master motor.
Figure 4:
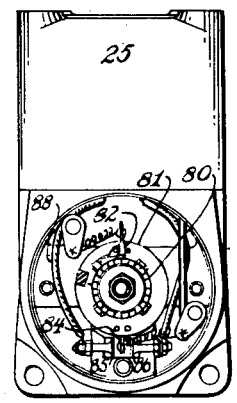
Fig. 4 is an end view of the propeller control assembly.

In the figures, 20 indicates an engine driven aeronautical propeller provided with electrical pitch changing means, a slip ring assembly 21 being provided between the engine and the propeller for the necessary electrical connections to the latter. A control assembly for one propeller is indicated at 25 which includes a rotor, shortly to be described in detail, driven by a master motor assembly 30, both of these units being connected to a power source such as a battery 29.

The engine, driving the propeller 20, is provided with a three-phase alternator 35 connected to the propeller control unit 25.

The master motor 30 comprises a motor armature 44 having a commutator 46 engaged by brushes 47, shunt field windings 48 for the armature being connected through a variable resistance 49 to a wire 50 leading to the battery. The other end of the field windings is connected to one of the brushes 47 through wires 51 and 52 to the other terminal of the battery 29. Part of the power to the armature 44 passes from the wire 50 through contacts 56 and 57 of a flyweight governor comprised by a spring 54 and weights 55, to a slip ring 59 whose brush leads to the lower brush 47. Adjustment for speed control is afforded by a screw 58 which varies the distance between the contacts 56 and 57. A resistor 60 is shunted across the governor contacts 56 and 57 by which the majority of current necessary to operate the master motor is led directly to the armature, while the balance of current for controlling speed passes through the governor contacts 56 and 57. When the master motor is in operation, the governor spring 54 vibrates at rather high frequency, making and breaking contact between the points 56 and 57 at such a rate as to provide an average motor operating current which will maintain armature speed extremely close to the pre-set datum.

It will be apparent that rapidly interrupted current is available at the lower brush 47 and this is utilized for operating a protective relay 62 comprised by a normally open switch 62a which is closed when a solenoid 62b is energized. The switch 62a is connected between a return wire 98 from the propeller controlled unit 25 and the wire 52 to the negative battery terminal. The solenoid 62b is connected across the output of a standard voltage doubler circuit composed of two condensers 62c and 62d and two rectifiers 62e and 62f. Such a doubler circuit permits the passage of alternating current but prevents the passage of direct current. Power from the governor contact 56 is led to a point between the condensers 62c and 62d through a wire 62g and the circuit is completed by a wire 62h leading from a point between the rectifiers 62e and 62f to the wire 52. To maintain the master motor at the desired speed, the governor must operate continuously to correct any variations from equilibrium conditions and in so doing, as mentioned before, the governor points 56, 57 open and close at the rate of several hundred cycles per second whereby interrupted D. C. equivalent to A. C. is conducted to the condensers 62c and 62d. By means of the rectifiers 62e and 62f the condensers are charged alternately and in the same direction to the full value of the A. C. component of voltage and are then discharged in series through the solenoid 62b thereby supplying it with D. C. at double the voltage of the A. C. component and insuring operation of the relay from a lower available A. C. voltage.

Should the governor contacts remain open for any reason as, for instance, when a surge of high voltage tends to over-speed the master motor, uninterrupted D. C. is imposed on the relay 62 and no energy can be transferred through the condensers to energize the solenoid. Should the contacts 56, 57 remain closed as, for instance, when the master motor cannot attain its governed speed, again uninterrupted D. C. is imposed on the protective relay 62 and no energy can be supplied to the solenoid 62b. For either fault, the switch 62a is opened and the propeller control system 25 will not respond to master motor speed but rather, will hold the propellers in fixed pitch. Thus, the propeller system is automatically prevented from synchronization with the master motor 30 unless the motor is at its correct speed and is functioning in a normal manner.

Upon the armature shaft we show a magnet 63 forming with a stator 64 a speed-responsive generator for actuating an electrical tachometer 65.

The propeller control assembly 25 includes a shaft mechanically driven by the motor armature shaft on which are disposed slip rings 72 engaged by brushes 73 connected through wires 74 to the engine driven alternator 35. Said slip rings feed a three-phase winding 76, the direction of rotation of the electrical field being opposite to the direction of rotation of the motor armature 44 whereby the electrical field, when the motor armature and alternator are in speed synchronism, is stationary. A rotationally driftable ring 78 embraces the field winding 76, this ring carrying a commutator 80 whose bars are cross-connected. Embracing the commutator 80 is an oscillatable member 81 carrying brushes 82 and 83 engaged with the commutator bars. The member 81 carries an arm 84 on which switch points are secured, said switch points being engageable with fixed contacts 85 or 86 according to the direction of rotation of the ring 78, which ring follows the electrical field 76 either clockwise or anti-clockwise as speed differences occur between the master motor and the alternator 35. Upon engagement of the contact 84 with either the contact 85 or the contact 86, propeller relay solenoids 89 or 91, respectively, are energized through wires 88 and 90. Through the use of a delay opening relay 95 connected to the contact 84 through a wire 99 and a pigtail 100, the propeller relays 89 or 91 are picked up when the commutator 80 cross-connects the brushes 82 and 83 and the pick-up of these relays is established for a definite time interval by the delay opening relay 95 regardless of the dwell of the commutator bars with the brushes 82 and 83. The return power circuit for the propeller relays 89 and 91 passes through a wire 98 to the protective relay switch 62a so that, when this switch is open, the propeller relays may not operate, whereby the propellers are held in fixed pitch.

The relays 89 and 91 operate power switches 101 and 102 which, through the heavy line wiring 103, 104 and 105 supply battery power to the pitch changing motor of the propeller 20.

A more detailed explanation of the operation of the propeller control assembly is contained in the above mentioned copending application but since, in the present case, it is merely exemplary of a controlled electrical system, a description of its functioning in detail is not deemed necessary.

While we have described our invention in detail in its present preferred embodment, it will be obvious to those skilled in the art, after understanding our invention, that various changes and modifications may be made therein without departing from the spirit or scope thereof. We aim in the appended claims to cover all such modifications and changes.

We claim as our invention:

1. In combination, an electrically operated speed reference device, a relay responsive in its operation to a speed increase or decrease of said device from a predetermined set speed, and a controlled mechanism normally responsive to the reference speed device so connected with said relay as to be unresponsive to said reference speed device when the latter deviates from its normal predetermined set speed.

2. In combination, a reference speed device, mechanism operated thereby, and a protective means responsive to a speed increase or decrease of said device from the reference speed to disconnect said device from said mechanism.

3. In combination, a normally constant speed electric motor, variable speed means, means to control said variable speed means to synchronism with the constant speed motor, and means responsive to deviations of said motor from its constant speed to disconnect said variable speed means therefrom.

4. In combination, a D. C. motor having a governor normally operable to make and break the motor circuit at a frequency such that the motor speed is maintained constant, mechanism controlled by said motor, and means responsive to failure of said governor to make and break the motor circuit to disconnect the controlled mechanism from said motor.

5. In combination, a D. C. motor having a governor controlled motor circuit switch normally operable to make and break a portion of the motor circuit at a frequency such that the average energy supplied to the motor maintains the motor at constant speed, mechanism controlled by said motor, and a device responsive to the frequent make and break of said switch to maintain an operative connection between said motor and said controlled mechanism.

6. In combination, a D. C. motor having a governor controlled motor circuit switch normally operable to make and break a portion of the motor circuit at a frequency such that the average energy supplied to the motor maintains the motor at constant speed, mechanism controlled by said motor, said switch make and break producing interrupted D. C. whose effect is analogous to A. C., and a relay responsive in its closing to A. C. connected into the motor circuit by which the controlled mechanism is operably connected to said motor.

7. In combination, a constant speed governed motor having an interrupted D. C. governing component in its circuit, controlled mechanism operated by said motor, and means to operably connect the motor and mechanism responsive in its operation only to the existence of said interrupted D. C. in said motor circuit.

8. In combination with a motor having a make-and-break governor switch, means operated by said motor, and means responsive to consistent make-and-break of said switch to maintain the motor and motor operated means in effective connection with one another.

9. In combination with a motor having a make-and-break governor switch, means operated by said motor, means to effect or sever the operative connection between said motor and operated means comprising a relay switch, and a solenoid energizable to close said relay switch only when said governor switch makes and breaks.

10. In combination with a motor having a make-and-break governor switch, means operated by said motor, means to effect or sever the operative connection between said motor and operated means comprising a relay switch, a solenoid energizable to close said relay switch, and a condenser serially connected between the solenoid and make-and-break switch.

11. In combination with a motor having a make-and-break governor switch, means operated by said motor, means to effect or sever the operative connection between said motor and operated means comprising a relay switch, a solenoid energizable by D. C. to close said relay switch, and a rectifying A. C. responsive circuit feeding said solenoid from said governor make-and-break switch.

12. In combination with a motor having a make-and-break governor switch, means operated by said motor, means to effect or sever the operative connection between said motor and operated means comprising a relay switch, a solenoid energizable by D. C. to close said relay switch, and rectifying voltage doubler circuit feeding said solenoid from said governor make-and-break switch.

13. In combination, a D. C. motor having a governor producing, during constant speed operation, a rapidly oscillating control current, means operated by said motor, a relay closable to connect the operated means with the motor, and a circuit responsive to said rapidly oscillating control current to energize said relay.

14. In combination, a D. C. motor having a governor producing, during constant speed operation, a rapidly oscillating control current, means operated by said motor, a relay closable to connect the operated means with the motor, and a circuit including a rectifier and condenser serially connected for conducting said rapidly oscillating control current to said relay.

15. In combination, a D. C. motor having a governor producing, during constant speed operation, a rapidly oscillating control current, means operated by said motor, a relay closable to connect the operated means with the motor, and a rectifying voltage doubler circuit responsive to said rapidly oscillating control current to energize said relay.

16. In combination, a normally constant speed electric motor, variable speed means, automatic electrical control means to maintain speed synchronism between said motor and variable speed means, and a protective relay responsive to a deviation in speed of said constant speed electric motor to render said automatic control means inoperative.

17. In combination, a normally constant speed device having an electric control circuit therefor, variable speed means, automatic electric control means operable to maintain speed synchronism between said devices, and a protective relay operable in response to the condition of the current in said control circuit, upon a speed deviation of said normally constant speed device, to render said automatic control inoperative.

18. In combination, a normally constant speed device, control means for said device, controlled mechanism normally responsive to said constant speed device, and protective means for said mechanism operable in response to the condition of said control means, upon a speed deviation of said constant speed device, to render said mechanism non-responsive to said device.

19. In combination, a normally constant speed electric motor, a control circuit for said motor having a normally oscillating current to maintain said motor speed, controlled mechanism normally responsive to said motor, and means responsive to a cessation of said oscillations to render said mechanism non-responsive to said motor.

CARL P. CLARE.
CHARLES W. CHILLSON.